United States Patent

[11] 3,599,066

[72] Inventor William S. Touchman
 Kettering, Ohio
[21] Appl. No. 849,110
[22] Filed Aug. 11, 1969
[45] Patented Aug. 10, 1971
[73] Assignee The National Cash Register Company
 Dayton, Ohio
 Continuation-in-part of application Ser. No.
 660,032, Aug. 11, 1967, now Patent No.
 3,460,343.

[54] CONTROL MEANS FOR INTERMITTENT MOTION
 MECHANISM
 4 Claims, 2 Drawing Figs.
[52] U.S. Cl. .................................................... 318/437
[51] Int. Cl. ............................................... H02k 23/16
[50] Field of Search ......................................... 318/437

[56] References Cited
 UNITED STATES PATENTS
 2,803,792  8/1957  Turner ..................... 318/437 X Primary Examiner—Oris L. Rader
Assistant Examiner—Gene Z. Rubinson
Attorneys—Louis A. Kline, Albert L. Sessler, Jr. and Elmer Wargo ABSTRACT: Control means for an intermittent, rotary-motion mechanism which operates at the resonant frequency of its rotating system. The rotating system includes an input member, an output member, and a resilient member (like a torsion shaft) interconnecting the input and output members. An exciter, like a magnetic oscillator, is used to start the rotating system and keep it oscillating at its resonant frequency to cause periodic dwells in the output member while the input member is rotated at a constant velocity. The control means includes a magnetic pickup for sensing the angles of oscillation of the output member and comparator circuits for comparing the output of the pickup with a reference signal. A controller circuit, acting in response to the comparator circuit, is used to control the voltage to a motor which rotates the input member. The motor has operating characteristics which enable it to produce an increase or a decrease in torque at a substantially constant speed.

PATENTED AUG 10 1971
3,599,066
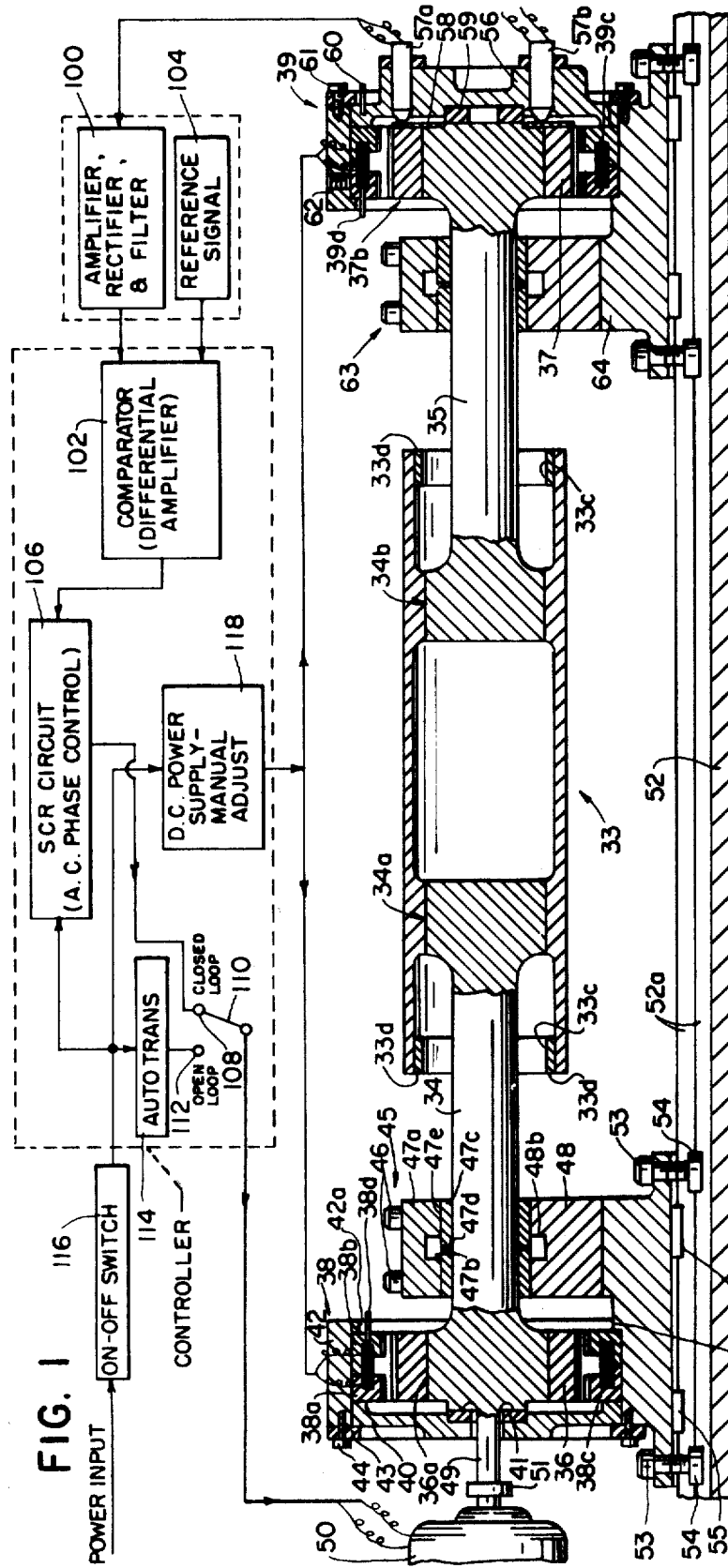
FIG. 1
FIG. 2
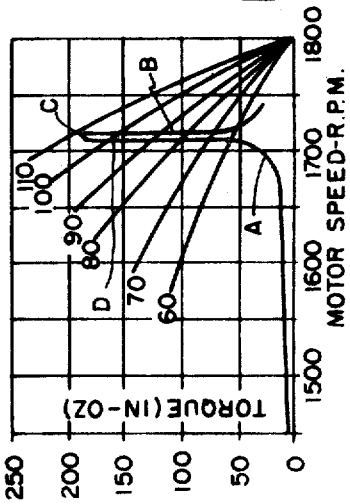
INVENTOR
WILLIAM S. TOUCHMAN
BY Louis A. Kline
Albert L. Sessler Jr.
Elmer Wargo
HIS ATTORNEYS

CONTROL MEANS FOR INTERMITTENT MOTION MECHANISM

CROSS-REFERENCE TO RELATED APPLICATION

This application is a continuation-in-part of U.S. patent application Ser. No. 660,032, filed on Aug. 11, 1967, by William S. Touchman, which application issued as U.S. Pat. No. 3,460,343 on Aug. 12, 1969, and was assigned to the assignee of the present application.

BACKGROUND OF THE INVENTION

This invention relates to a control means for an intermittent motion mechanism which includes a rotating system having an output member which periodically dwells at the resonant frequency of the rotating system.

Intermittent motion mechanisms on which the control means of this invention may be used are shown in the copending U.S. patent application previously mentioned. Additional mechanisms on which said control means may be used are shown in U.S. Pat. No. 3,309,988, which issued Mar. 21, 1967, on the application of William S. Touchman applicant of the present application.

While the intermittent motion mechanism shown in said patent and copending application can be operated without any control means to maintain a constant oscillation of the output members thereof, a control means is useful when the mechanisms are used in applications which require uniform effective dwell characteristics. The control means is also useful in starting-up procedures to prevent an overshoot of the resonant peak of the mechanism.

The control means is also useful when the mechanisms are operated from power sources having wide voltage fluctuations.

A control means for intermittent motion mechanisms of the type generally described is shown in said patent; the control means shown therein is frequency controlled.

The control means of the present invention provides more accurate control and is less expensive to produce than the control means shown in said patent.

SUMMARY OF THE INVENTION

This invention relates to a control means for an intermittent motion mechanism or device which operates at the resonant frequency of its rotating system. The rotating system includes an input means, an output means, and a resilient means interconnecting the input means and the output means. An exciter means is used to start the rotating system and keep it oscillating at its resonant frequency to cause periodic dwells in the output means while the input means is rotated at a constant velocity. The control means includes a sensing means for sensing the angles of oscillation of the output means, and a comparator circuit means for comparing the output of the sensing means with a reference signal. A controller circuit means, acting in response to the output of the comparator circuit means is used to control the voltage to a motor which rotates the input means. The motor has operating characteristics which enable it to produce an increase or a decrease in torque at a substantially constant speed.

BRIEF DESCRIPTION OF THE DRAWING

FIG. 1 includes a general block diagram of the control means of this invention as applied to an intermittent rotary motion mechanism or device which is shown in elevation and cross section, with the section line thereof being taken along the axis of rotation of the mechanism.

FIG. 2 is a graph used to illustrate some of the principles of the intermittent motion devices with which the control means may be used.

DESCRIPTION OF THE PREFERRED EMBODIMENT

Before proceeding with a detailed discussion of the control means of this invention, it seems appropriate to discuss, generally, the type of intermittent rotary motion device with which the control means may be used. FIG. 1 shows one such device.

The intermittent motion device shown in FIG. 1 is used in a high speed printer of the type using a rotating printing drum having printing characters on its periphery. The drum 33 is fixed to torsion shafts 34 and 35 to rotate therewith, and the shafts are rotatably mounted in bearings 45 and 63, respectively. The shaft 34 has a rotor 36 secured thereto, and similarly, the shaft 35 has a rotor 37 secured thereto. The rotor 36 cooperates with an oscillator 38 in a manner to be described later in detail, and, similarly, the rotor 37 cooperates with an oscillator 39. The drum 33 is rotated at a constant velocity by a motor 50, whose output shaft is connected to a reduced-diameter portion 49 of the shaft 34 by a coupling 51. When the oscillators 38 and 39 are energized, they act upon the shafts 34 and 35, respectively, subjecting them to torsional strains which induce torsional oscillations of the rotors 36 and 37 opposed to the oscillations of the drum 33, and, after a steady-state resonance and proper angle of oscillation are achieved, as defined in said patent and copending patent application, the drum 33 will periodically dwell a predetermined number of times for each complete revolution of the shafts 34 and 35. It is during the dwells of the drum 33 that printing is effected in a conventional manner by print hammers (not shown). The control means of this invention may be extended to other embodiments of the intermittent motion devices shown in said patent and copending patent application.

Damping losses present in intermittent motion devices of the type shown in FIG. 1 must be supplied by the motor 50. These losses include:
a. Material damping,
b. Exciter damping,
c. Bearing damping,
d. Air damping, and
e. Interface damping.

In general, interface damping at the frequency of the fundamental mode vibration must be virtually eliminated. If it is initially present in an intermittent motion device, it will, in all probability, increase as the device continues in operation. It is important that the lumped sum of the remaining damping parameters listed above remain essentially constant, as greatly simplified means for maintaining a constant amplitude of oscillation of the shafts or the output member (drum 33) is thereby made possible.

Such a simplified means of operating an essentially linear device at or near resonance can be understood by referring to FIG. 2. A plot of r.p.m. vs. torque of a system excited for rotary oscillation is represented by a rise curve portion A, a fall portion B, and a peak point C. The curve A C B is in reality a frequency curve, since $F=D \times r.p.m./60$, in which $D$ is the number of effective dwells per revolution of the forward rotation of the intermittent motion device. In operation, the system of FIG. 2 was maintained at a constant level of excitation. Operation near the resonant peak C (as, for example, point $D$) in one embodiment of the invention corresponded to a steady-state input torque of approximately 158 in. oz., with a motor speed of 1,710 r.p.m., and with a torsional oscillation amplitude of $\pm 0.018$ radian.

The other curves of FIG. 2, labeled 60, 70, 80, 90, 100, and 110 (representing voltages), are speed-torque curves of an induction motor used to drive the oscillating system. The points where the motor speed-torque curves intersect the rise curve A of the vibrating system represent conditions of power balance; that is, the power output of the motor exactly balances the power required to overcome damping losses, or to maintain the corresponding peak-to-peak angle of the torsional oscillation. If the damping in the system and the motor characteristics therein remain constant, the angle of oscillation of the system will remain constant without the use of any control means.

If the motor voltage is increased to a point where its corresponding speed-torque curve (FIG. 2) no longer intersects the rise curve A of the steady-state "damping torque" (as, for example, above point C), the system immediately goes out of resonance with a sharp increase in motor speed. Intersection points of the motor's speed-torque curves with the fall curve B cannot be achieved, because, to operate successfully with the fall curve B, would require an electric motor whose output torque somehow managed to increase while the voltage thereto (to decrease its speed) was reduced. The foregoing method of operation for resonant oscillating systems is obviously not limited to induction motors, but any motor (series, DC etc.) which has similar speed-torque curves, either designed for the application or under positive voltage control, can be used.

After having reviewed some of the analytical techniques used in studying the problem of damping as related to an intermittent motion device of the type shown in FIG. 1, it seems appropriate to describe the device in detail.

The intermittent motion device shown in FIG. 1 illustrates the general relationship of the various elements common to the intermittent motion devices shown in said patent and copending patent application.

FIG. 1 is essentially a cross-sectional view of a drum system combined with a schematic block diagram of the control means needed for sustaining the torsional oscillation of the drum close to peak resonance and for maintaining a constant angle of oscillation thereof. The system shown could be used where it is necessary to start and stop a drum a given number of times per second, as in a high speed printer as described in said patent; however, in FIG. 1, only the control for maintaining the system at resonance is shown, as the projected use may well include uses other than for printer applications.

The drum 33 (FIG. 1) has, on opposed ends thereof, aligned bores 34a and 34b, which cooperate with torsion shafts 34 and 35, respectively, to provide a secure, shrink-fit connection therebetween. A close tolerance, high quality fit is necessary at said shrink-fit connection for a smooth operation of the embodiment. Each bore 34a and 34b is located approximately one quarter of the drum length away from its respective closest end of the drum.

The shafts 34 and 35 (FIG. 1) are rotatably supported in the air bearings 34 and 63, respectively, and the outer end of the shaft 34 is fitted into an opening 36a of the rotor 36, while the outer end of the shaft 35 is similarly fitted into an opening 37b of the rotor 37 to provide the shrink-fit connections mentioned in the previous paragraph.

The rotor 36 (FIG. 1) is magnetically coupled to its associated stator to provide an oscillator 38 or exciter for the shaft 34, as was described in said patent. Similarly, the rotor 37 is magnetically coupled to its stator to provide an oscillator 39 for the shaft 35.

The stator for the oscillator 38 (FIG. 1) is constructed as follows. Magnet rings 38a and 38b, having the complementary shapes shown in cross section, cooperate to form an annular recess, into which the coil 38c is positioned. After the coil 38c is positioned in said recess, the rings 38a and 38b are secured together by dowels to enclose the coil 38c, and thereby form a subassembly which is moved in an axial direction in the circular housing 42 to envelop the rotor 36 and to abut against a shoulder 42a in said housing 42. Said subassembly is retained in the housing 42 by the circular plate 40, which abuts against the ring 38a. The plate 40 is secured to the housing 42 by a thick, washer-shaped plate 43 and fasteners 44. The circular plate 40 also has, in its center, a hole through which the driving shaft 34a may freely pass and rotate. A suitable thrust bearing 41 is positioned in an annular recess on the circular plate 40 to receive the axial thrust of the shaft 34. The housing 42 for the stator of the oscillator 38 is secured to the base 52 by conventional means including bolts 53, nuts 54, guide blocks 55, and a T-shaped slot 52a.

The air bearing 45, previously alluded to, supports the torsion shaft 34 on a thin film of air. The bearing 45 is conventional and includes upper and lower semicircular halves 47 and 48, respectively, which are secured together by bolts 46 and in which plenums 47b and 48b are respectively located. Members 47c, which are also semicircular halves, envelop the shaft 34 and also form an airtight connection between them and their respective halves 47 and 48 at the joining surfaces 47e. Each of the members 47c has a plurality of conduits 47d equally spaced around its periphery, so as to enable air from their respective plenums 47b and 48b to pass to the contacting surfaces between the shaft 34 and the members 47c to thereby provide a cushion of air on which the shaft 34 rotates. The air passing between said contacting surfaces is, of course, allowed to escape. The air bearing 63 is similar in construction to the air bearing 45, just described.

The intermittent motion apparatus shown in FIG. 1 is supplied with a constant velocity rotation by the shaft 49, which is actually a reduced-diameter portion of the shaft 34. The shaft 34 has a predetermined flexibility, and is connected to the drive motor 50 by the coupling 51.

The exciter or magnetic oscillator 39 (FIG. 1) is substantially the same as the oscillator 38, with the following exceptions. The plate 56, which is similar to the plate 40 of the oscillator 38, has thereon means for mounting one or more magnetic read heads, such as 57a and 57b, which cooperate with a magnetically coated disc 58, which is rigidly secured to the torsion shaft 35 and the exciter rotor 37. A bearing 59 is rigidly secured to the plate 56 to provide a bearing surface for the axial thrust of the shaft 35.

Also secured to the plate 56 is a pin 60, which can be used to angularly position the plate 56 relative to the base 52. This positioning is actually accomplished by loosening the plurality of screws 61 and gently tapping the pin 60 to rotate the plate 56. A setscrew 62 keeps the stator ring assembly (similar to the rings 38a and 38b of the oscillator 38) from rotating while making the adjustment to position the plate 56. The air bearing assembly 63 is mounted on the housing 64, which in turn is also mounted on the base 52.

When air is supplied to the air bearings 45 and 63, the complete rotating assembly literally floats on air, the only friction occurring at the thrust bearings 41 and 59, which are made of an antifriction material, such as porous bronze. The use of the air bearings 45 and 63 allows the shafts 34 and 35 to flex in torsion without contact with any solid material. Since the surfaces of the torsion shafts are surfaces of maximum stress at the maximum angle of oscillation $\Phi_o$, the importance of this feature can become important in preventing fatigue failure of highly stressed, torsion-shaft-type spring elements.

The magnetic oscillators 38 and 39 (FIG. 1) have pins 38d and 39d, which can be used to angularly position the stator ring elements (such as 38a and 38b of the oscillator 38) by loosening the screws 44 or the screws 61, respectively, as required. Normally, both stators can be phased by adjusting only one stator assembly, as follows: Assume that the magnetic oscillator 39 is locked down tight; that is, the screws 61 and the setscrew 62 thereof are tightened, and the screws 44 of the left oscillator 38 are loosened. If a DC voltage is then applied to both exciter coils (the coils 38c and 39c), the magnetic forces created will exert torques to line up the respective rotor and stator teeth of each said oscillator. In the process, the magnet rings 38a and 38b of the oscillator 38 will rotate together in the housing 42 to accomplish the phasing operating, and, when finished, with both coils 38c and 39c remaining energized, the screws 44 are tightened securely.

If the drum 33 of FIG. 1 has thereon type characters which are equally spaced around the perimeter of the drum, and if the number of characters is equal to the number of effective dwells D per forward revolution of the drum 33, it may then be necessary to rotate both stator assemblies of the magnetic oscillators 38 and 39 in order to phase the effective dwells of the drum 33 so as to align the characters with a stationary reference point, such as the base 52. To accomplish this, the screws 44 and 61 (of the oscillator 38) and the set screw 62

(of the oscillator 39) would be loosened, and, with both exciter coils (38c, 39c) energized, the stator ring elements, such as 38a and 38b of the oscillator 38 and the stator ring elements of the oscillator 39, can be rotated the desired amount to obtain the phasing mentioned in the previous paragraph by tapping tangentially on the pin 38d or 39d (or both). All screws are then retightened while the coils are still energized.

For controlling the indexing of drum 33 (FIG. 1), one ring of magnetic pulses may be statically formed and evenly spaced on the coated disc 58, the number of pulses being equal to the number of effective dwells D per revolution of the drum 33. The pulses are read by a magnetic read head 57a, which is used to measure the steady-state peak angle of oscillation of the rotor 37 as follows:

The computed relation between the angle of oscillation at section X-X and at section Y-Y (FIG. 1) must be known. As described in said copending patent application, the torsional oscillations at plane X-X and plane Y-Y are opposed to each other and are relative to a nodal surface N-N. For a balanced system, as shown in FIG. 1, the angle of oscillation at plane X-X of the torsion shaft 35 will equal (or very nearly equal) the angle of oscillation at plane X'-X' of the torsion shaft 34. Likewise, the angle of oscillation at plane Y-Y of the rotor 37 will equal (or very nearly equal) the angle of oscillation at plane Y'-Y' of the rotor 36. Mathematical means for accurately calculating the amplitudes of torsional oscillation at planes X-X and Y-Y relative to the nodal surface N-N have been known for a considerable length of time. However, due to the effects of the distributed mass of the drum 33 and the torsion shafts 34 and 35, the exact calculations are too laborious without the use of a computer analysis.

If it be assumed that the structural elements of the system have been so designed that the angle of oscillation at planes X-X and X'-X' equals the angle of oscillation at planes Y-Y and Y'-Y', respectively (relative to the nodal surfaces N-N and N'-N'), it is relatively easy to describe how it is possible to monitor the steady state oscillation of the drum 33 at the planes X-X and X'-X'.

A careful study of the various embodiments of applicant's intermittent motion devices disclosed in said patent and copending application has revealed that, when a dwell occurs in the output members thereof, the dwell lasts for approximately one-quarter cycle. One mathematical formula expressing an idealized dwell can be written as:

*Equation 1*

$$\phi_0 = \frac{\eta \sec 45°}{4D} = \frac{1.11072}{D} = \frac{1.11072}{D} \text{ radians}$$

Since $$f = \frac{ND}{60}$$

for a self-excited system, the derivative of Equation 1 may be converted to:

*Equation 2*

$$\dot\theta_{max} = \frac{2\pi f}{D} + \frac{2\pi f}{D}[1.11072 \cos 2\pi]$$

$$= 2\pi N/60 \times [1 + 1.11072] \text{ rad./sec.}$$

$$\dot\theta_{max} = .22103 \ N \text{ rad./sec.} = 2.11072 N \text{ r.p.m.}$$

where N is the r.p.m. of the rotor 37 while undergoing steady rotation at resonance, and $\dot\theta_{Max}$ is the steady-state peak angle of oscillation of the rotor 37.

Therefore, the first step to measure this peak angle is to plot the peak-to-peak voltage output of the magnetic read head 57a vs. the steady rotation N' of the system with the exciter coils 38c and 39c (FIG. 1) deenergized, from zero r.p.m. to the r.p.m. defined by Equation 2, above. In this instance, means must be provided for driving the shaft 34a at a series of selected speeds and for monitoring the voltage output of the magnetic read head 57a at each speed. The voltage plot vs. r.p.m. should be a straight line function, and the linear relationship will be used in the next step.

Assuming that the stators 38 and 39 (FIG. 1) have been phased as described previously, and with the setscrew 62 tightened, the screws 61 are loosened slightly, so that it is possible to rotate the plate 56 by gently tapping on the pin 60. The system is now brought into resonance by manually controlling the voltage to drive motor 50, using the method described in connection with FIG. 2. To accomplish the purpose at hand, the voltage impressed on the exciter coils 38c and 39c must be sufficient so that a noticeable angle of oscillation will be established, and it is necessary to energize the exciter coils before the rotating system is brought all the way up to the resonant speed.

The method used for determining whether or not an angle of oscillation is established is to look at a point on an active element undergoing the intermittent motion, such as the rotor teeth 37b of FIG. 1. As the angle of oscillation is increased to 1/D radians, the effective dwells, which are visible to the naked eye, become sharper and sharper, and, at angles near the ideal of 1.11072/D, these dwells appear as though they were produced by a stroboscopic light.

With an angle of oscillation established and maintained at a steady-state condition, the plate 56 (FIG. 1) is slowly rotated until the voltage from the magnetic read head 57a becomes a maximum. Depending upon the angle of oscillation during this operation, it is possible for the read head 57a to read anywhere from a peak positive voltage down through zero to a peak negative voltage per cycle as the plate 56 is rotated. After the maximum is established, the screws 61 are tightened, and the unit is ready for operation.

The magnetic read head 57a (FIG. 1) is now adjusted so that the peak voltage generated thereat corresponds to the maximum angular velocity of the torsional oscillating system. Therefore, if the steady rotation (N r.p.m.) is determined from the plot of voltage vs. r.p.m. from the above step, using as the voltage the output value from the read head 57a, the actual angle of oscillation is easily determined by the following relation:

*Equation 3*

$$\phi = \frac{N' - N}{ND}$$

where N is again the r.p.m. of the steady-state rotation of the nodal surfaces at resonance.

It must be understood that the above steps are used only for the purpose of obtaining an absolute indication of the magnitude of the angle of oscillation of the system. In actual practice, the technique is much simpler, since the voltage pulses from the magnetic read head 57a (FIG. 1) can be converted to a steady DC signal which is directly related to the peak values of the pulses.

As shown in the block diagram portion of FIG. 1, the steady DC signal is produced by conventional amplifier, rectifier, and filter circuits shown as a block 100, whose output is fed into a conventional comparator 102. The block 104 represents a standard reference DC signal (whose magnitude may be manually adjusted), and which signal is also fed into the comparator 102. The output of the comparator 102 is fed into a conventional silicon-controlled rectifier circuit 106 (hereinafter called an SCR circuit). The SCR circuit uses silicon-controlled rectifiers as the primary phase switching element to alter the voltage characteristics to the motor 50, thereby changing its torque producing capability in accordance with damping and other power losses, as previously explained. The output of the SCR circuit is fed to a terminal 108 of a manually operated switch 110. When the switch 110 is in the position shown, a "closed loop" system of automatic control is established, whereby the intermittent motion device shown in FIG. 1 is maintained at an exact angle of oscillation. The closed loop system operates in a range on the rise portion A of the curve shown in FIG. 2. The frequency response of the "closed loop" system described does not need to be high to respond to the steady state changes in the system. However, when the motor 50 is turned on and its speed approaches the resonant frequency, and the exciters 38 and 39 are turned on, as previously explained, a fast response time of the "closed loop" system described is advantageous so as to prevent the motor 50 from causing an "overshoot" of the resonant frequency.

The control means shown in FIG. 1 can be changed from a "closed loop" to an "open loop" in the following manner. The switch 110 is moved from the terminal 108 to a terminal 112, thereby connecting the output of an autotransformer 114 with the motor 50. The autotransformer 114 can be adjusted manually to control the voltage to the motor 50 to maintain a constant angle of oscillation of the device. The autotransformer 114 is supplied by power which passes through an off-on switch 116. A power supply 118 is used to supply a manually adjustable DC voltage to the exciters 38 and 39.

The quality of the effective dwells of the device shown in FIG. 1 can be readily determined by an operator looking at a point (like 37b), as previously described, or by an "angle of oscillation" meter which utilizes the voltage from the read head 57a according to the principles previously described in connection with Equation 3.

Other read heads, such as 57b, can be added to the assembly of the plate 56 (FIG. 1) for the purpose of clocking the position of the effective dwells of the drum 33. However, these other read heads must be of the "Hall Effect" type, which are not responsive to the velocity of the disc 58 but are responsive only to the presence and intensity of the stored magnetic field. For example, the use of six "Hall Effect" read heads 57b, spaced angularly apart around the axis 49 of the shafts 34 and 35 and at different radii therefrom, can be used to binarily monitor the position of 64 effective dwells per cycle, using a Gray or similarly coded disc arrangement.

Vibrations which are normal to the surface of the drum 33 (FIG. 1) create objectionable sound, and rings 33c are used to deaden these vibrations. The principle used is well known (see "Mechanical Vibrations," by Den Hartog, Fourth Edition, pages 105 and 106) and requires that the rings 33c be shrink-fitted into the inside diameter of the drum 33 (as shown), so that the contact pressure or clearance between the rings and the drum falls within a certain range. If the rings are too tight or too loose, no sound deadening will result. A few tack welds, as at 33d, at each end of the drum are used to prevent the damping effects of the rings 33c from reducing the amplitude of the torsional vibrations.

In operation, the stators 38 and 39 (FIG. 1) receive D torque pulsations per revolution of the forward rotation of the nodal sections N-N and N'-N'. These torque pulsations are similar to those occurring in the stator frame of an electric motor, like the motor 50, and can be a cause of objectionable noise and should therefore be minimized in the usual manner, as by installing vibration dampers on the plate 52, etc.

Attaching the shafts 34 and 35 to the drum 33 (FIG. 1) at sections X'-X' and X-X, respectively, increases the uniformity of the peak angle of oscillation $\Phi_o$ over the full length of the drum 33.

What I claim is:

1. Control means for an intermittent motion device having:
   rotatable input means including resilient means;
   rotating means for rotating said input means at a substantially constant velocity, including a motor having operating characteristics which enable the motor to produce a change in torque at a substantially constant speed;
   rotatable output means operatively connected to said input means; and
   oscillator means acting upon said resilient means at substantially the resonant frequency of said input and output means so as to cause said output means to effectively dwell a desired number of times for each revolution of said input means while said input means is rotated at said constant velocity;
   said control means comprising:
   sensing means for sensing the angles of oscillation of said output means;
   converting means for converting the output of said sensing means to a DC signal which is related to the peak values of said angles of oscillation;
   means for producing a reference signal corresponding to a desired angle of oscillation;
   comparing means for comparing said DC signal to said reference signal; and
   controller means responsive to said comparing means for altering the torque of said motor so as to maintain said desired angle of oscillation of said output means.

2. The control means as claimed in claim 1 in which said motor is an induction motor and said controller means include silicon-controlled rectifier means for altering the voltage to said motor.

3. The control means as claimed in claim 1 further comprising switch means for bypassing said controller means enabling the voltage to said motor to be manually altered.

4. The control means as claimed in claim 3 in which said switch means includes a variable transformer for altering the voltage to said motor.